(12) United States Patent
Hu et al.

(10) Patent No.: US 12,461,555 B2
(45) Date of Patent: Nov. 4, 2025

(54) QUICK RELEASE STRUCTURE AND DISPLAY DEVICE

(71) Applicant: PEGATRON CORPORATION, Taipei (TW)

(72) Inventors: Geng-Siang Hu, Taipei (TW); Wei-Lung Lin, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 175 days.

(21) Appl. No.: 18/385,464

(22) Filed: Oct. 31, 2023

(65) Prior Publication Data
US 2024/0143021 A1   May 2, 2024

(30) Foreign Application Priority Data
Nov. 2, 2022   (TW) .................................. 111141709

(51) Int. Cl.
*G06F 1/16*   (2006.01)

(52) U.S. Cl.
CPC .......... *G06F 1/1607* (2013.01); *G06F 1/1654* (2013.01)

(58) Field of Classification Search
CPC .. G06F 1/1654; F16B 2/00; F16B 2/02; F16B 2/04; F16B 2/12
See application file for complete search history.

(56) References Cited

U.S. PATENT DOCUMENTS

| | | | | |
|---|---|---|---|---|
| 3,009,225 A * | 11/1961 | Budreck | ............... | H01F 7/0252 |
| | | | | 24/303 |
| 3,086,268 A * | 4/1963 | Chaffin, Jr. | .......... | A44B 15/002 |
| | | | | 70/459 |
| 4,754,532 A * | 7/1988 | Thomson | .................. | H01F 7/02 |
| | | | | 24/303 |
| 5,166,893 A * | 11/1992 | Hosoi | .................... | G06F 1/1679 |
| | | | | 361/679.29 |
| 5,177,894 A * | 1/1993 | Dunsford | ............... | A01K 91/08 |
| | | | | 43/43.12 |
| 6,366,440 B1 * | 4/2002 | Kung | ..................... | E05C 19/16 |
| | | | | 361/679.55 |

(Continued)

FOREIGN PATENT DOCUMENTS

| | | |
|---|---|---|
| CN | 208079268 U | 11/2018 |
| CN | 113001978 A | 6/2021 |

(Continued)

*Primary Examiner* — Adrian S Wilson
(74) *Attorney, Agent, or Firm* — Li & Cai Intellectual Property (USA) Office

(57) ABSTRACT

A display device includes a monitor, a fixing bracket, and a quick release structure. The quick release structure includes a housing, a first connector assembly and a second connector assembly. The first connector assembly includes two pressing members and a linkage mechanism. One of the two pressing members is pressed and pushed by an external force to drive the other of the two pressing members to move synchronously, such that the two pressing members move to respective sides of the housing or both move to a center of the housing to be engaged in or detached from a monitor. The second connector assembly includes a plurality of magnets and a moving member. The moving member is configured to drive the plurality of magnets to reciprocate, such that the plurality of magnets are magnetically attached or released from the fixing bracket.

10 Claims, 8 Drawing Sheets

(56) References Cited

U.S. PATENT DOCUMENTS

| | | | | |
|---|---|---|---|---|
| 6,922,333 | B2* | 7/2005 | Weng | G06F 1/1616 |
| | | | | 220/230 |
| 7,054,152 | B2* | 5/2006 | Francke | G06F 1/1616 |
| | | | | 361/679.55 |
| 7,583,500 | B2* | 9/2009 | Ligtenberg | G06F 1/1616 |
| | | | | 361/147 |
| 7,652,873 | B2* | 1/2010 | Lee | G06F 1/1681 |
| | | | | 248/920 |
| 7,775,567 | B2* | 8/2010 | Ligtenberg | E05C 19/16 |
| | | | | 292/DIG. 37 |
| 7,852,621 | B2* | 12/2010 | Lin | G06F 1/1616 |
| | | | | 361/679.02 |
| 8,264,829 | B2* | 9/2012 | Moser | G06F 1/1637 |
| | | | | 349/150 |
| 9,377,815 | B2* | 6/2016 | Chen | G06F 1/1654 |
| 11,089,698 | B2* | 8/2021 | Monroe | F16M 11/22 |
| 2004/0246666 | A1* | 12/2004 | Maskatia | G06F 1/1624 |
| | | | | 361/679.57 |
| 2009/0103261 | A1* | 4/2009 | Shih | H05K 5/0221 |
| | | | | 361/728 |
| 2010/0238620 | A1* | 9/2010 | Fish | G06F 1/1654 |
| | | | | 361/679.29 |
| 2014/0049894 | A1* | 2/2014 | Rihn | G06F 1/1616 |
| | | | | 335/219 |
| 2021/0282278 | A1* | 9/2021 | Hsieh | G06F 1/1616 |

FOREIGN PATENT DOCUMENTS

| | | |
|---|---|---|
| TW | 1323402 B | 4/2010 |
| TW | M428607 U | 5/2012 |

* cited by examiner

QUICK RELEASE STRUCTURE AND DISPLAY DEVICE

CROSS-REFERENCE TO RELATED PATENT APPLICATION

This application claims the benefit of priority to Taiwan Patent Application No. 111141709, filed on Nov. 2, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a quick release structure and a display device, and more particularly to a quick release structure and a display device capable of quickly assembling and disassembling a monitor and a fixing bracket.

BACKGROUND OF THE DISCLOSURE

In the related art, a monitor and a support bracket are connected by using screws to fasten the support bracket to the monitor through screw holes arranged on the back of the monitor. Alternatively, the monitor and the support bracket are connected by using hooks to fix the support bracket to the monitor through corresponding grooves arranged on the back of the monitor.

However, using screws for fastening is a time-consuming process and is not suitable for repeated assembly and disassembly. At the same time, using hooks for fixing may cause structural mismatch; that is, a certain type of monitors can only be assembled with a support bracket with corresponding structures. Hence, a user will not be able to adjust a height or a rotation angle of the monitor because the support bracket cannot be replaced.

Therefore, how to overcome the above-mentioned problem through an improvement in structural design has become an important issue to be addressed in the related art.

SUMMARY OF THE DISCLOSURE

In response to the above-referenced technical inadequacies, the present disclosure provides a quick release structure and display device so as to address an issue of the monitor and the fixing bracket being unable to be quickly disassembled and assembled.

In order to solve the above-mentioned problems, one of the technical aspects adopted by the present disclosure is to provide a quick release structure, which includes a housing, a first connector assembly disposed, and a second connector assembly. The first connector assembly is disposed in the housing. The first connector assembly includes two pressing members and a linkage mechanism. The linkage mechanism is connected between the two pressing members. One of the two pressing members is pressed by an external force to drive the other of the two pressing members to move synchronously, such that the two pressing members move to respective sides of the housing or both move to a center of the housing to be engaged in or detached from a monitor. The second connector assembly is disposed in the housing. The second connector assembly includes a plurality of magnets and a moving member. The moving member is configured to drive the plurality of magnets to move, such that the plurality of magnets are magnetically attached to or released from a fixing bracket.

In order to solve the above-mentioned problems, another one of the technical aspects adopted by the present disclosure is to provide a display device, which includes a monitor, a fixing bracket, and a quick release structure. The monitor has a positioning groove and two fastening portions. The positioning groove is located between the two fastening portions. The fixing bracket has a metal docking portion. The quick release structure is configured to assemble the monitor and fixing bracket. The quick release structure includes a housing, a first connector assembly disposed, and a second connector assembly. The first connector assembly is disposed in the housing. The first connector assembly includes two pressing members and a linkage mechanism. The linkage mechanism is connected between the two pressing members. One of the two pressing members is pressed by an external force to drive the other of the two pressing members to move synchronously, such that the two pressing members move to respective sides of the housing or both move to a center of the housing to be engaged in or detached from the two fastening portions. The second connector assembly is disposed in the housing. The second connector assembly includes a plurality of magnets and a moving member. The moving member is configured to drive the plurality of magnets to move, such that the plurality of magnets are magnetically attached to or released from the metal docking portion.

Therefore, in the quick release structure and the display device provided by the present disclosure, by virtue of the two pressing members of the first connector assembly being respectively engaged in or detached from the two fastening portions of the monitor, and the plurality of magnets of the second connector assembly being magnetically attached to or released from the metal docking portion of the fixing bracket, the monitor and the fixing bracket can be quickly disassembled and assembled.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
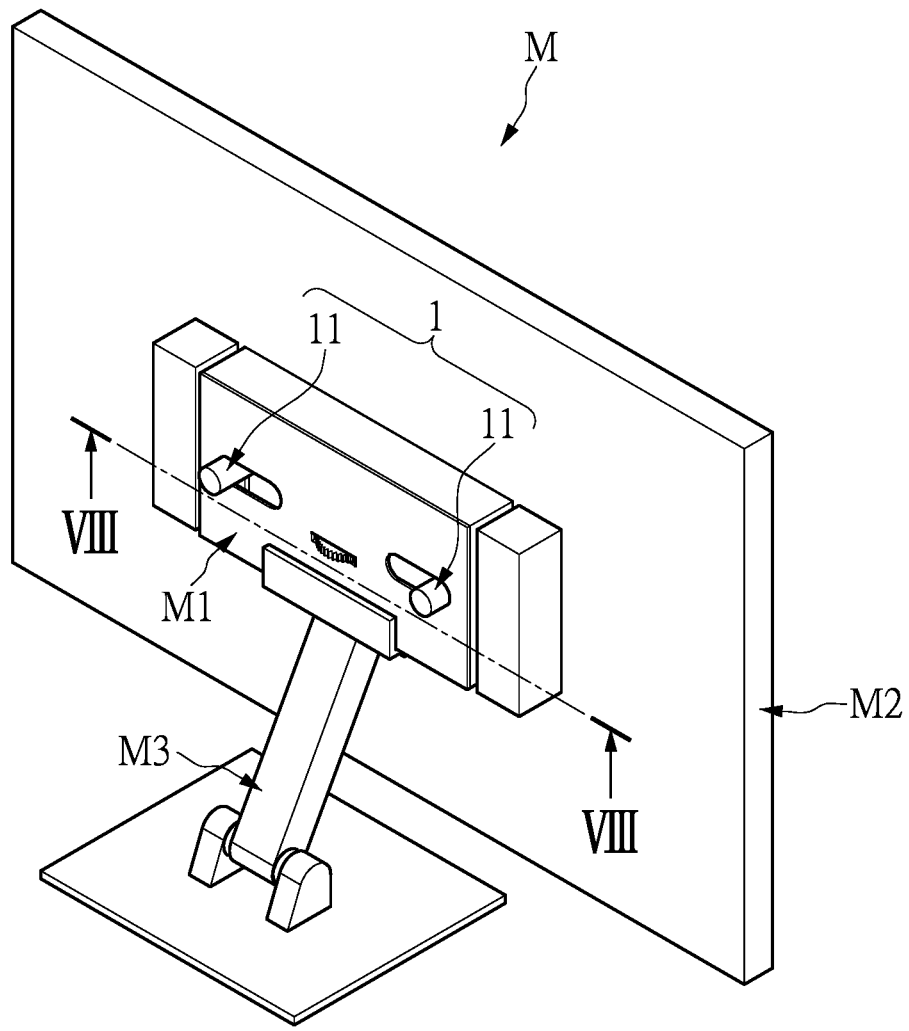
FIG. 1 is a schematic perspective view of a display device according to the present disclosure.
Figure 2:
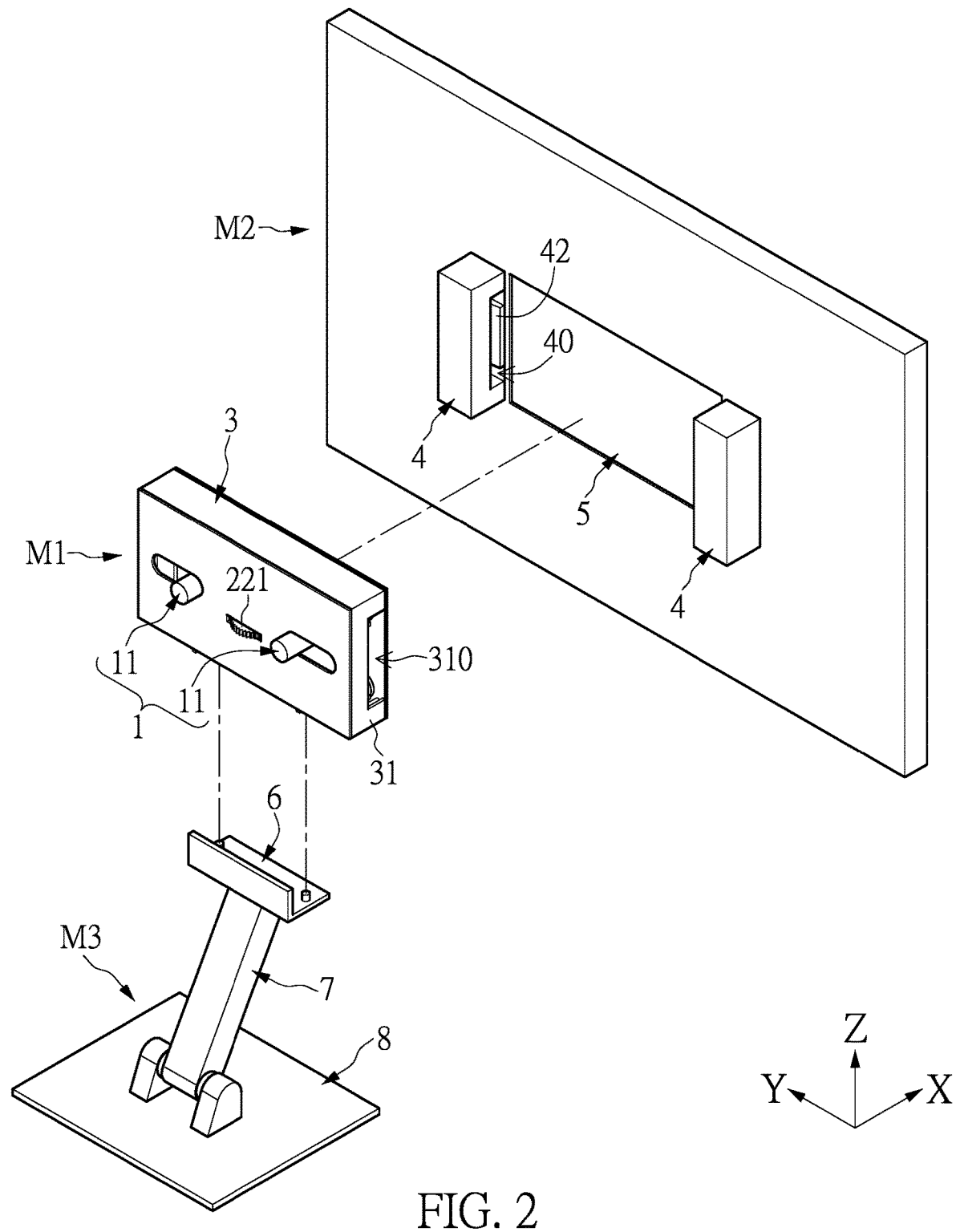
FIG. 2 is schematic exploded view of the display device according to the present disclosure.

Referring to FIG. 1 and FIG. 2, FIG. 1 is a schematic perspective view of a display device according to the present disclosure, and FIG. 2 is schematic exploded view of the display device according to the present disclosure. The present disclosure provides a display device M, which includes a quick release structure M1, a monitor M2, and a fixing bracket M3. The monitor M2 includes two fastening portions 4, and the two fastening portions 4 are disposed on one side of the monitor M2, that is, the back side of the monitor M2. The fixing bracket M3 includes a metal docking portion 6, an axial post 7, and a base 8. One end of the axial post 7 is pivotally connected to the base 8, and the other end of the axial post 7 is connected to the metal docking portion 6. For example, the metal docking portion 6 may be a metal piece made of magnetic material. However, the shape of the metal docking portion 6 is not limited in the pre sent disclosure.

Figure 3:
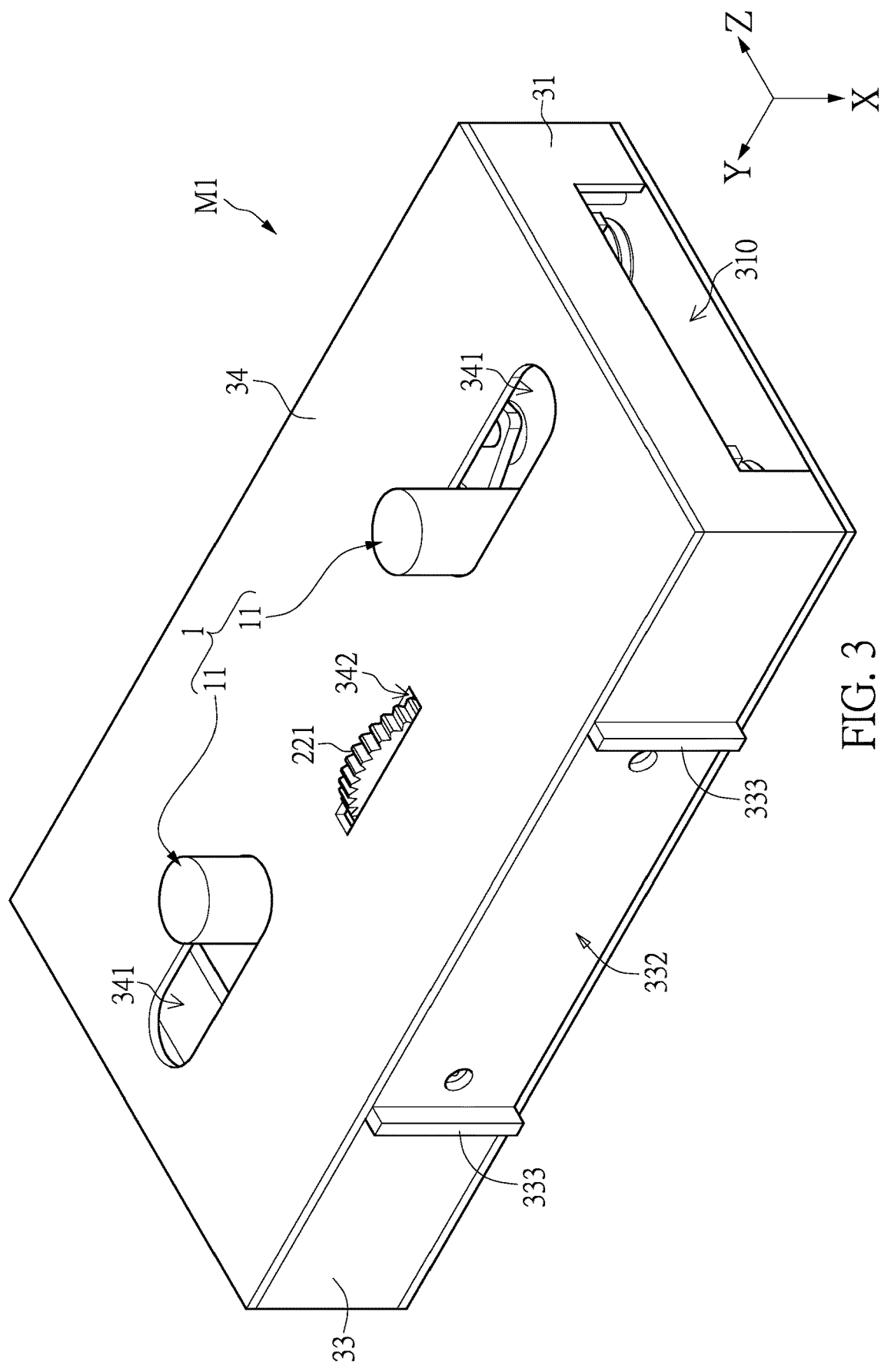
FIG. 3 is a schematic perspective view of a quick release structure according to the present disclosure.
Figure 4:
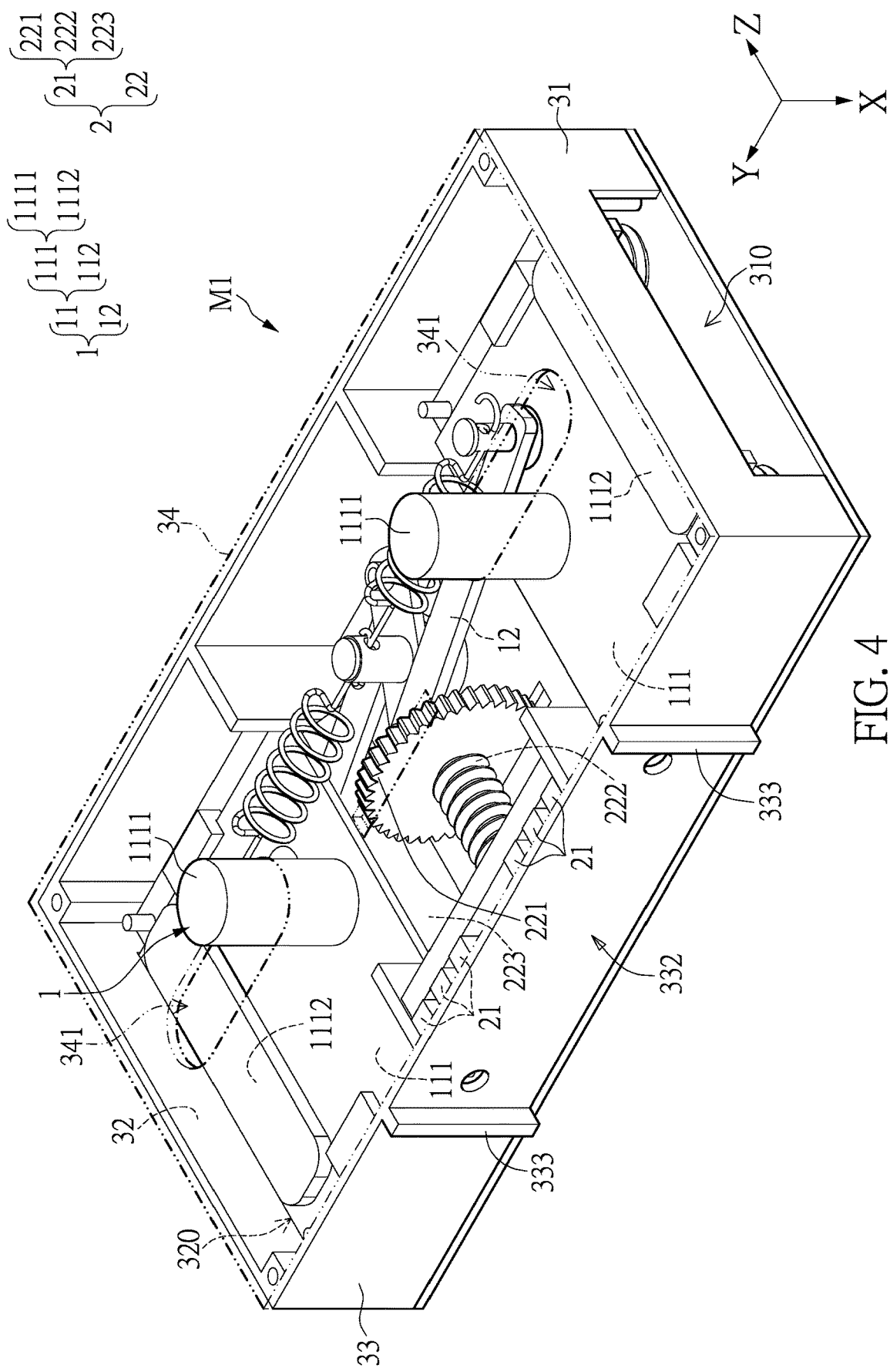
FIG. 4 is a schematic view inside the quick release structure according to the present disclosure.
Figure 8:
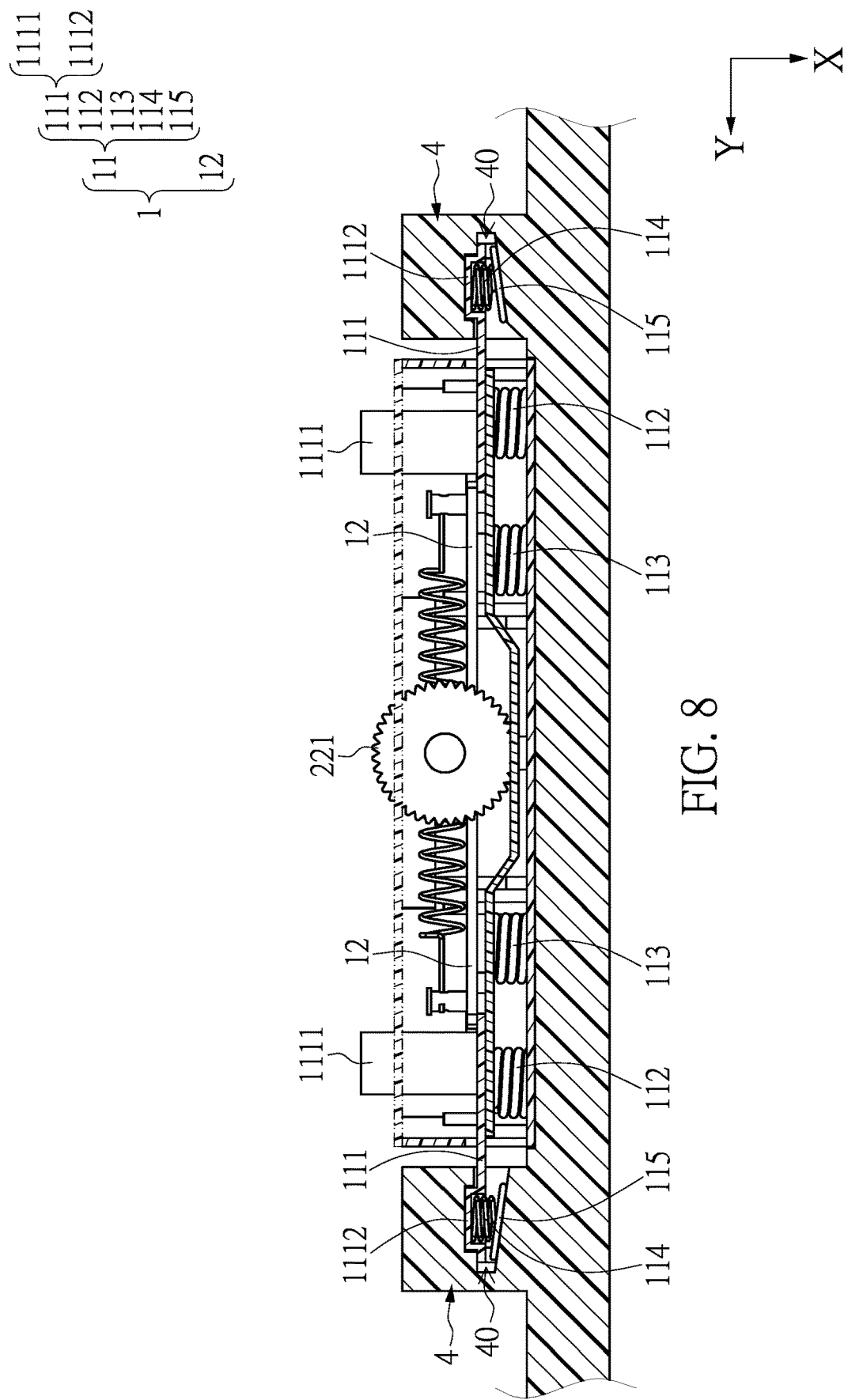
FIG. 8 is a schematic cross-sectional view along line VIII-VIII of FIG. 1.

Referring to FIGS. 3, 4, and 8, FIG. 3 is a schematic perspective view of a quick release structure according to the present disclosure, FIG. 4 is a schematic view inside the quick release structure according to the present disclosure, and FIG. 8 is a schematic cross-sectional view along line VIII-VIII of FIG. 1. The quick release structure M1 includes a first connector assembly 1, a second connector assembly 2, and a housing 3. The first connector assembly 1 and the second connector assembly 2 are disposed in the housing 3. The first connector assembly 1 includes two pressing members 11 and a linkage mechanism 12. The second connector assembly 2 includes a plurality of magnets 21 and a moving member 22.

Further, the housing 3 has a first sidewall 31, a second sidewall 32, a third sidewall 33, and a cover plate 34. The third sidewall 33 is connected between the first sidewall 31 and the second sidewall 32. The first sidewall 31 and the second sidewall 32 have two respective openings 310 and 320. The third sidewall 33 has an inner surface 331, an outer surface 332, and two limiting portions 333. The two limiting portions 333 are disposed on the outer surface 332. The cover plate 34 has two first slots 341 and a second slot 342. As shown in FIG. 3, the second slot 342 is located between the two first slots 341.

Referring to FIG. 4 and FIG. 8, each of the two pressing members 11 includes a pressing plate 111, a first elastic element 112, a second elastic element 113, a third elastic element 114, and an abutting plate 115. The pressing plate 111 includes a pressing portion 1111 and an engaging protrusion 1112. The first elastic element 112, the second elastic element 113, the third elastic element 114, and the abutting plate 115 are disposed under the pressing plate 111. The first elastic element 112 and the second elastic element 113 are disposed between the pressing plate 111 and a bottom of the housing 3. The third elastic element 114 is disposed between the engaging protrusion 1112 and the abutting plate 115. For example, each of the elastic element 112, the second elastic element 113, and the third elastic element 114 includes a plurality of springs, but a quantity of the springs is not limited in the present disclosure. The positions of two pressing plates 111 correspond to the two openings 310 and 320, and the two pressing portions 1111 are exposed out of the two first slots 341. The linkage mechanism 12 is connected between the two pressing plates 111. The linkage mechanism 12 includes a plurality of connecting rods and springs, but a quantity of the connecting rods and a way of connection are not limited in the present disclosure. The moving member 22 includes an actuator 221, a threaded rod 222, and a supporting element 223. The actuator 221 is fixed to one end of the threaded rod 222. The supporting element 223 is movably disposed on the threaded rod 222. The plurality of magnets 21 are fixed to the supporting element 223 and face the inner surface 331 of the third sidewall 33. The actuator 221 is exposed out of the second slot 342.

Figure 5:
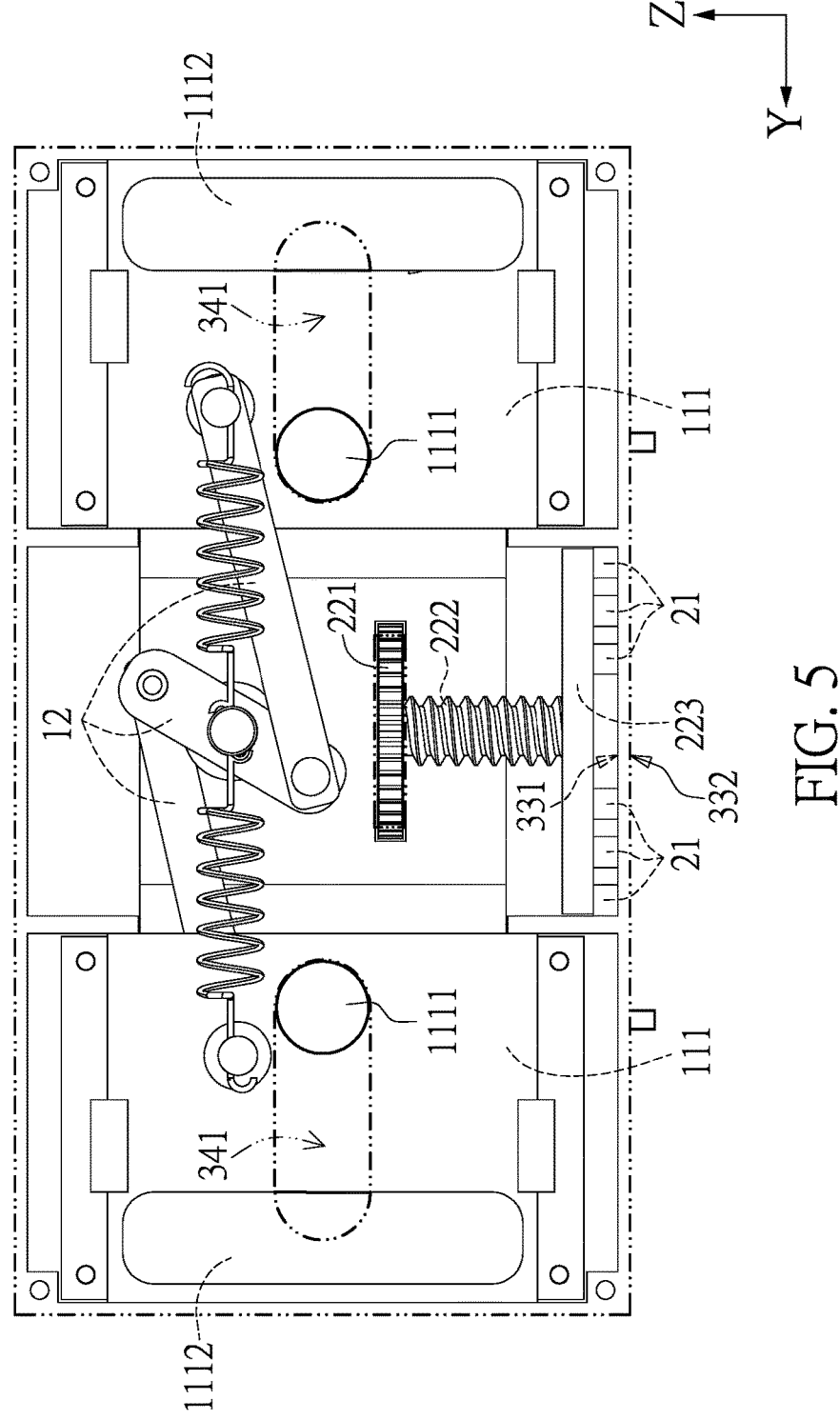
FIG. 5 is a schematic view of a the quick release structure according to an embodiment of the present disclosure.
Figure 6:
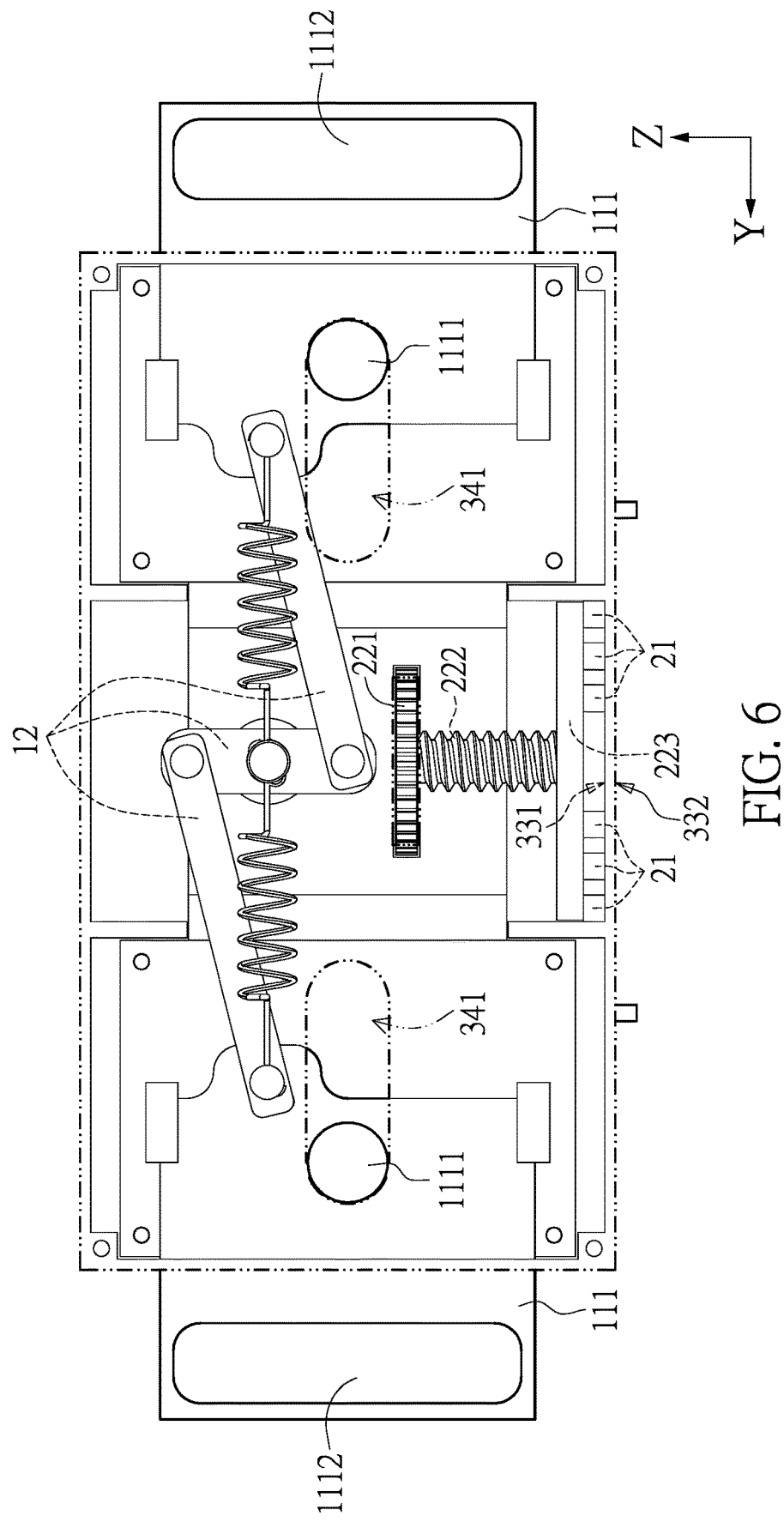
FIG. 6 is a schematic view of the quick release structure according to another embodiment of the present disclosure.

Referring to FIG. 5 and FIG. 6, FIG. 5 shows a scenario in which the two pressing members 11 of the quick release structure M1 are retracted into the housing 3, and FIG. 6 shows a scenario in which the two pressing members 11 of the quick release structure M1 are pushed outside the housing 3. Because the linkage mechanism 12 is connected between the two pressing members 11, the pressing members 11 are capable of interlocking with each other. A user only needs to apply external force to press and push the pressing portion 1111 of one of the two pressing members 11, and the other of the two pressing members 11 can be driven to move synchronously through the linkage mechanism 12. Specifically, the two first slots 341 may be used as a strip track. When one of the two pressing portions 1111 is pressed and pushed by the external force, the two pressing portions 1111 are pushed downward to abut against the two first elastic elements 112 and the second elastic elements 113 simultaneously, such that each of the two pressing portions 1111 moves along the corresponding one of the two first slots 341, and the two pressing plates 111 move toward respective sides of the housing 3 or the center of the housing 3 along the positive and negative Y-axis directions to be engaged on the two sides of the two fastening portions 4 of the monitor M2.

Figure 7:
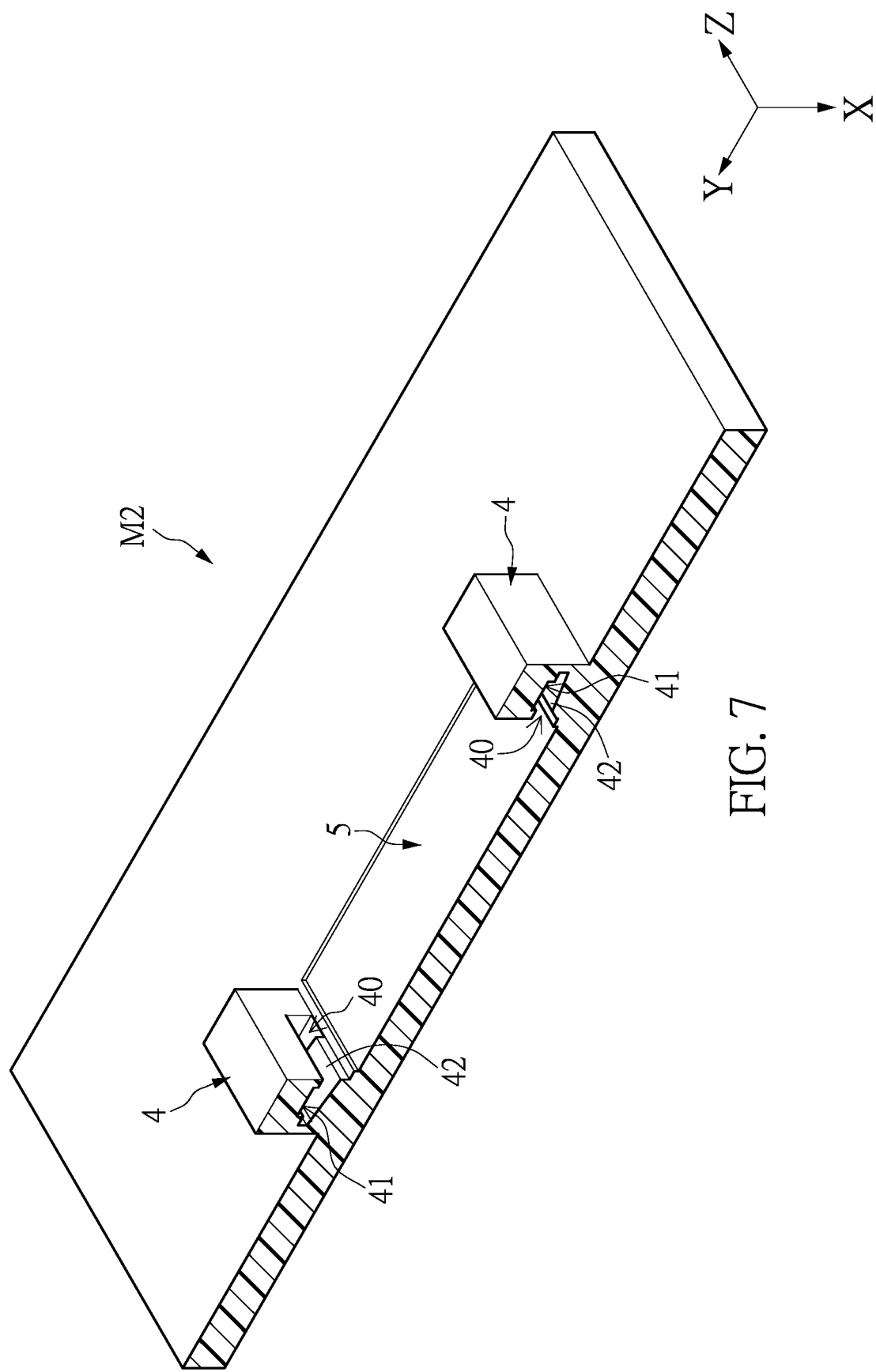
FIG. 7 is a schematic exploded view of a monitor of the display device according to the present disclosure.

Referring to FIGS. 6, 7, and 8, FIG. 7 is a schematic exploded view of a monitor of the display device according to the present disclosure, and FIG. 8 is a schematic cross-sectional view along line VIII-VIII of FIG. 1. The monitor M2 includes two fastening portions 4 and a positioning groove 5. The positioning groove 5 is located between the two fastening portions. Specifically, the two fastening portions 4 have two fastening grooves 40. Each of the two fastening grooves 40 has an engaging recess 41 and a platform portion 42 that are opposite to each other. As shown in FIG. 7, a surface of the platform portion 42 is a flat inclined plane.

Referring to FIGS. 1, 6, and 8, when the quick release structure M1 and the monitor M2 are to be assembled with each other, the housing 5 of the quick release structure M1 is placed in the positioning groove 5. Then, one of the two pressing portions 1111 of the two pressing plates 111 is pressed and pushed, such that the two pressing plates 111 are simultaneously pushed down to abut against the two first elastic elements 112 and the two second elastic elements 113. The two first elastic components 112 and the two second elastic components 113 are compressed and deformed to store an elastic restoring force. The two pressing plates 111 pass through the two openings 310, 320 along the positive and negative Y-axis directions, and insert into the two fastening grooves 40. The two abutting plates 115 abut against the two platform portions 42 and are guided upward by the inclined plane of the two platform portions 42 to push the two third elastic elements 114 to be compressed and deformed to store another elastic restoring force. Therefore, the elastic restoring forces stored in the two first elastic components 112, the two second elastic components 113, and the two third elastic elements 114 make the two pressing plates 111 and two engaging protrusions 1112 thereof move upward (i.e., in a negative X-axis direction as shown in FIG. 8) to be engaged in the two engaging recesses 41.

On the contrary, referring to FIGS. 2, 5, and 8, when the quick release structure M1 and the monitor M2 are to be disassembled, one of the two pressing portions 1111 of the two pressing plates 111 is pressed and pushed, such that the two pressing plates 111 are simultaneously pushed down to abut against the two first elastic elements 112 and the two second elastic elements 113, and the two engaging protrusions 1112 are pushed down to abut against the two third elastic elements 114. The two first elastic elements 112, the two second elastic elements 113, and the two third elastic elements 114 are compressed and deformed to store the elastic restoring forces. The two engaging protrusions 1112 are detached from the two engaging recesses 41, and the two pressing plates 111 withdraw from the two fastening grooves 40. Moreover, the two pressing plates 111 pass through the two openings 310, 320 and retract into the housing 3.

On the other hand, when the quick release structure M1 and the monitor M2 are to be assembled with each other, the metal docking portion 6 of the fixing bracket M3 is firstly disposed between the two limiting portions 333 and abuts against the outer surface 332 of the third sidewall 33 of the housing 3. The actuator 221 is rotated to drive the threaded rod 222 to move the plurality of magnets 21, such that the plurality of magnets 21 abut against the inner surface 331 of the third sidewall 33. The metal docking portion 6 located between the two limiting portions 333 is aligned with the plurality of magnets 21, such that the plurality of magnets 21 may attract the metal docking portion 6, and the quick release structure M1 may be fixed to the fixing bracket M3 along the Z-axis direction. Accordingly, the quick release structure M1 and the monitor M2 may be assembled with each other to form the display device M shown in FIG. 1.

On the contrary, when the quick release structure M1 and the monitor M2 are to be disassembled, the actuator 221 is rotated to drive the threaded rod 222 to move the plurality of magnets 21, such that the plurality of magnets 21 are away from the inner surface 331 of the third sidewall 33 and no longer magnetically attract the metal docking portion 6. Accordingly, the display device M may be disassembled into three parts: the quick release structure M1, the monitor M2, and the fixing bracket M3 shown in FIG. 2.

In conclusion, in the quick release structure M1 and the display device M provided by the present disclosure, by the two pressing members 11 of the first connector assembly 1 being engaged in or detached from the two fastening portions 4 of the monitor M2, and by the plurality of magnets 21 of the second connector assembly 2 being magnetically attached to or released from the metal docking portion 6 of the fixing bracket M3, the monitor M2 and the fixing bracket M3 may be quickly disassembled and assembled.

Moreover, the pressing members 11 are capable of interlocking with each other because the linkage mechanism 12 is connected between the two pressing members 11. A user only needs to apply external force to press and push the pressing portion 1111 of one of the two pressing members 11, and the other of the two pressing members 11 may be driven to move synchronously through the linkage mechanism 12. In addition, through the reciprocation of the supporting element 223 driven by the threaded rod 222, the distance between the plurality of magnets 21 and the metal docking portion 6 of the fixing bracket M3 may be changed to control the magnetic force generated by the plurality of magnets 21, such that the fixing bracket M3 and the quick-release structure M1 may be quickly assembled or disassembled.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A quick release structure, comprising:
   a housing;
   a first connector assembly disposed in the housing, wherein the first connector assembly comprises two pressing members and a linkage mechanism, the linkage mechanism is connected between the two pressing members; wherein one of the two pressing members is pressed by an external force to drive the other of the two pressing members to move synchronously, such that the two pressing members move to respective sides of the housing or both move to a center of the housing to be engaged in or detached from a monitor; and
   a second connector assembly disposed in the housing, wherein the second connector assembly comprises a plurality of magnets and a moving member; wherein the moving member is configured to drive the plurality of magnets to move, such that the plurality of magnets are magnetically attached to or released from a fixing bracket.

2. The quick release structure according to claim 1, wherein the housing comprises a first sidewall, a second sidewall, a third sidewall, and a cover plate, wherein the first sidewall and the second sidewall are opposite to each other, the third sidewall is connected between the first sidewall and the second sidewall, the first sidewall and the second sidewall have two respective openings, the third sidewall has an inner surface, an outer surface, and two limiting portions, the two limiting portions are disposed on the outer surface, and the cover plate has two first slots and a second slot.

3. The quick release structure according to claim 2, wherein each of the two pressing members comprises a pressing plate, an abutting plate, a first elastic element, a second elastic element, and a third elastic element, the pressing plate comprises a pressing portion and an engaging protrusion, the linkage mechanism is connected between the two pressing plates of the two pressing members, the two pressing plates of the two pressing members correspond to the two openings, the two pressing portions of the two pressing plates are exposed out of the two first slots, the first elastic element and the second elastic element are disposed between the pressing plate and a bottom of the housing, and the third elastic element is disposed between the engaging protrusion and the abutting plate.

4. The quick release structure according to claim 3, wherein the moving member comprises an actuator, a threaded rod, and a supporting element, the actuator is fixed to one end of the threaded rod, the supporting element is movably disposed on the threaded rod, the plurality of magnets are fixed to the supporting element and face the inner surface of the third sidewall, and the actuator is exposed out of the second slot.

5. A display device, comprising:
   a monitor including a positioning groove and two fastening portions, wherein the positioning groove is located between the two fastening portions;
   a fixing bracket including a metal docking portion; and
   a quick release structure according to claim 4.

6. The display device according to claim 5, wherein the two fastening portions have two fastening grooves, each of the two fastening grooves has an engaging recess and a platform portion that are opposite to each other, and the two pressing plates correspond to the two fastening grooves.

7. The display device according to claim 6, wherein, when the quick release structure and the monitor are to be assembled with each other, the quick release structure is located in the positioning groove, and one of the two pressing portions is pressed and pushed, such that the two pressing plates are simultaneously pushed down to abut against the two first elastic elements and the two second elastic elements, and the two pressing plates pass through the two openings and insert into the two fastening grooves; wherein the two abutting plates abut against the two platform portions and are guided upward by the two platform portions to push the two third elastic elements, such that the two engaging protrusions are displaced and engaged in the two engaging recesses of the two fastening grooves.

8. The display device according to claim 6, wherein, when the quick release structure and the monitor are to be disassembled, one of the two pressing portions is pressed and pushed, such that the two pressing plates are simultaneously pushed down to abut against the two first elastic elements and the two second elastic elements, and the two engaging protrusions are pushed down to abut against the two third elastic elements, the two engaging protrusions are detached from the two engaging recesses and withdraw from the two fastening grooves, and the two pressing plates pass through the two openings and retract into the housing.

9. The display device according to claim 5, wherein, when the quick release structure and the monitor are to be assembled with each other, the metal docking portion of the fixing bracket is disposed between the two limiting portions, the metal docking portion abuts against an outer surface of the third sidewall of the housing, and the actuator is rotated to drive the threaded rod to move the plurality of magnets, such that the plurality of magnets abut against the inner surface of the third sidewall and magnetically attract the metal docking portion.

10. The display device according to claim 5, wherein, when the quick release structure and the monitor are to be disassembled, the actuator is rotated to drive the threaded rod to move the plurality of magnets, such that the plurality of magnets are away from the inner surface of the third sidewall and do not magnetically attract the metal docking portion.

* * * * *